United States Patent
Liu et al.

(10) Patent No.: US 6,219,088 B1
(45) Date of Patent: *Apr. 17, 2001

(54) NTSC INTERFERENCE REJECTION FILTER

(75) Inventors: Tian-Min Liu, Dana Point; Loke Kun Tan, Laguna Niguel; Steven T. Jaffe, Irvine; Robert A. Hawley, Tustin, all of CA (US)

(73) Assignee: Broadcom Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/303,783

(22) Filed: Apr. 30, 1999

Related U.S. Application Data

(60) Provisional application No. 60/106,938, filed on Nov. 3, 1998.

(51) Int. Cl.$^7$ ....................................... H04N 5/38
(52) U.S. Cl. ............................ 348/21; 348/607; 455/295; 455/296
(58) Field of Search ............................ 348/21, 725, 726, 348/727, 607; 455/201, 202, 203, 204, 210, 207, 209, 317; 375/270, 277, 321, 346, 348, 349, 350; 329/318, 320, 349, 353, 356

(56) References Cited

U.S. PATENT DOCUMENTS 5,214,501   5/1993   Cavallerano et al. ............. 358/12
5,235,424   8/1993   Wagner et al. .................... 358/174

(List continued on next page.)

OTHER PUBLICATIONS

Samueli, et al, "A 60-MHz 64-Tap Echo Canceller/Decision-Feedback Equalizer in 1.2-$\mu$m CMOS for 2B1Q High Bit-Rate Digital Subscriber Line Transceivers", IEEE 1991 Custom Integrated Circuits Conference, May 1991, pp. 7.2.1–7.2.4.

(List continued on next page.)

Primary Examiner—Michael Lee
(74) Attorney, Agent, or Firm—Christie, Parker & Hale, LLP

(57) ABSTRACT

An electronic, programmable filter is disclosed which selectively removes interference, noise or distortion components from a frequency band without perturbing any of the other signals of the band. An input frequency band such as a television channel spectrum is initially demodulated to baseband and applied to the input of the filter. The baseband spectrum is combined in a complex mixer with a synthesized frequency signal that shifts the spectrum a characteristic amount, in the frequency domain, so as to position an interference component in the region about DC. Once shifted, the frequency components about DC are removed by DC canceler circuit and the resulting spectrum is mixed with a subsequent synthesized frequency signal which shifts the spectrum back to its original representation and baseband. The frequency signals are developed by a programmable frequency synthesizer which a user may program with an intelligence signal that defines the frequency location of an interference signal within the spectrum. Filter blocks may be added or subtracted in order to optimize the filter response for any number of interference components for which rejection is desired.

16 Claims, 4 Drawing Sheets

U.S. PATENT DOCUMENTS

| | | | |
|---|---|---|---|
| 5,282,023 | | 1/1994 | Scarpa ................................... 358/36 |
| 5,311,547 | | 5/1994 | Wei ........................................ 375/18 |
| 5,321,725 | | 6/1994 | Paik et al. .............................. 375/39 |
| 5,337,056 | * | 8/1994 | Dax ...................................... 342/128 |
| 5,410,368 | | 4/1995 | Krishnamurthy et al. ........... 348/726 |
| 5,550,596 | | 8/1996 | Strolle et al. ......................... 348/607 |
| 5,572,249 | | 11/1996 | Ghosh ................................... 348/21 |
| 5,583,889 | | 12/1996 | Citta et al. ............................ 375/341 |
| 5,596,606 | | 1/1997 | Montreuil ............................. 375/327 |
| 5,600,677 | | 2/1997 | Citta et al. ............................ 375/296 |
| 5,636,251 | | 6/1997 | Citta et al. ............................ 375/341 |
| 5,659,583 | * | 8/1997 | Lane ...................................... 375/346 |
| 5,694,419 | | 12/1997 | Lawrence et al. .................... 375/222 |
| 5,706,057 | | 1/1998 | Strolle et al. ......................... 348/426 |
| 5,796,786 | | 8/1998 | Lee ........................................ 375/326 |
| 5,799,037 | | 8/1998 | Strolle et al. ......................... 375/233 |
| 5,805,242 | | 9/1998 | Strolle et al. ......................... 348/726 |
| 5,872,815 | | 2/1999 | Strolle et al. ......................... 375/321 |
| 5,894,334 | | 4/1999 | Strolle et al. ......................... 348/725 |
| 6,005,640 | | 12/1999 | Strolle et al. ......................... 348/726 |
| 6,081,697 | * | 6/2000 | Haartsen ............................... 455/109 |

OTHER PUBLICATIONS

Tan, et al, "A 200–MHz Quadrature Digitial Synthesizer/Mixer in 0.8–$\mu$m CMOS", IEEE 1994 Custom Integrated Circuits Conference, May 1994, pp. 4.4.1–4.4.4.

Hawley, et al, "A 300 MHz Digital Double–Sideband to Single–Sideband Converter in 1 $\mu$m CMOS", IEEE Journal of Solid–State Circuits, vol. 30, No. 1, Jan. 1995, pp. 4–10.

Tan, et al, "An 800MHz Quadrature Digital Synthesizer with ECL–Compatible Output Drivers in 0.8$\mu$m CMOS", 1995 IEEE International Solid–State Circuits Conference, Feb. 1995, pp. 258–259 and p. 376.

Hawley, et al, "Design Techniques for Silicon Compiler Implementations of High–Speed FIR Digital Filters", IEEE Journal of Solid–State Circuits, vol. 31, No. 5, May 1996, pp. 656–667.

Tan, et al, "A 70–Mb/s Variable–Rate 1024–QAM Cable Receiver IC with Integrated 10–b ADC and FEC Decoder" IEEE Journal of Solid–State Circuits, vol. 33, No. 12, Dec., 1998, pp. 2205–2218.

D'Luna, et al, "A Dual–Channel QAM/QPSK Receiver IC with Integrated Cable Set–Top Box Functionality", IEEE 1998 Custom Integrated Circuits Conference, May 1998, pp. 15.4.1–15.4.4.

ATSC Digital Television Standard, *Annex D, RF/Transmission Systems Characteristics*, pp. 46–60. (Sep. 16, 1995).

ATSC Standard *RF/Transmission Systems,* Guide to the Use of the ATSC Digital Standard, pp. 96–101, (Oct. 4, 1995).

ATSC Standard, *Receiver Characteristics*, Guide to the Use of the ATSC Digital Television Standard, pp. 102–136. (Oct. 4, 1995).

* cited by examiner

NTSC INTERFERENCE REJECTION FILTER

This Application claims benefit of Provisional Appln. No. 60/106,938, filed Nov. 3, 1998.

FIELD OF THE INVENTION

The invention relates generally to television signal transmission systems and methods and, more particularly, to a system and method for eliminating the effects of NTSC analog television signal interference components on digital advanced television (DATV) signals when both are simultaneously transmitted in the same frequency band.

BACKGROUND OF THE INVENTION

Recent years have witnessed the establishment of a standard for transmission of high definition television (HDTV) signals, over both cable and terrestrial broadcast modes throughout the United States. Although it offers significantly enhanced picture resolution, terrestrial broadcast of HDTV signals is somewhat problematic due to the almost universal installed base of conventional NTSC broadcast and more particularly, reception equipment. The present system provides for simultaneous transmission (simulcast broadcasting) of HDTV signals and conventional NTSC analog television signals in order to provide high definition television services without obsoleting the installed base of NTSC receivers. Conceptually, program material is encoded into the two different formats (NTSC and HDTV) and simultaneously broadcast over respective 6 MHz transmission channels. Viewers having conventional NTSC equipment would be able to receive and view NTSC programs by tuning in the appropriate NTSC channel, while viewers equipped with HDTV equipment would be able to receive an HDTV program by tuning their receiver to the appropriate HDTV channel. While conceptually simple, simultaneous broadcast of NTSC and HDTV signals often results in characteristic portions of an NTSC signal interfering with adjacent channel or co-channel HDTV signals causing degradation to the HDTV signal.

The cause of this form of signal degradation is well understood by those familiar with high definition television transmission systems and is conventionally termed NTSC co-channel interference. Various means have been proposed in the art to reduce NTSC co-channel interference in current HDTV transmission methodologies, and particularly with respect to vestigial sideband (VSB) HDTV transmissions, which form the basis of the HDTV standard in the United States. Certain of these conventional NTSC interference rejection means are summarized in ATSC standard A/53 (1995) *ATSC Digital Television Standard.* Briefly, the interference rejection properties of a conventional HDTV system are based on the frequency location of the principal components of the NTSC co-channel interfering signal within the 6 MHz television channel.

FIG. 1 depicts a typical 6 MHz channel spectrum, represented in baseband in the frequency domain (i.e., symmetric about DC), and illustrated in its characteristic raised cosine form 10 with root Nyquist band edges. NTSC co-channel interference is generally recognized as caused by the three principal carrier components of an NTSC signal; the video carrier (also termed the luma or luminance carrier), the color subcarrier (also termed the chroma or chrominance subcarrier), and the audio carrier (also termed the aural carrier). In the illustrative channel spectrum diagram of FIG. 1, the location and approximate magnitudes of the three principal NTSC components are depicted with the video carrier, indicated at V, located approximately 1.25 MHz from the lower channel band edge. The color subcarrier, C, is located approximately 3.58 MHz above the video carrier frequency and the audio carrier, A, is located approximately 4.5 MHz above the video carrier frequency (i.e., approximately 0.25 MHz from the upper channel band edge). As depicted in the Figure, and as well understood in the art, NTSC carrier component interference is of particular concern due to the relatively large amplitudes of the video carrier V and color subcarrier C which characterize and NTSC transmission. Although the audio carrier A is present at a relatively smaller amplitude, it nevertheless contributes a significant interference characteristic. Thus, it will be understood that NTSC co-channel interference rejection is an important consideration in the design of HDTV reception equipment. The carrier and subcarrier components of an interfering NTSC signal must be removed from an HDTV channel in order to ensure the enhanced quality of an HDTV signal.

A conventional approach to NTSC co-channel interference rejection is based on the frequency location of the principal components of the NTSC co-channel interfering signal within the 6 MHz HDTV channel and the periodic nulls of a conventional twelve symbol, feed-forward, subtractive, baseband comb filter, disposed conventionally in the demodulation path of a typical prior art-type VSB receiver.

Such a conventional baseband comb filter is depicted in semi-schematic block diagram form in FIG. 2 and suitably comprises a 1 tap linear feed-forward filter, indicated generally at 12, which can be represented as in terms of a feed-forward delay stage 13 providing an inverted, delayed, input component to a composite adder 14. Such comb filters are well understood by those having skill in the art and its component parts and principals of operation require no further explanation herein. It will suffice to state that the delay stage 13 is constructed such that the filter produces an output spectrum having periodic spectral nulls equally spaced about $57 \times f_H$(896.85 kHz) apart, where $f_H$ is equal to the NTSC horizontal line rate. Thus, as shown in FIG. 3, there are 7 periodic nulls occurring within the 6 MHz channel band, with the NTSC video carrier frequency V falling approximately 2.1 kHz below the second null of the comb filter, the color subcarrier C falling near the sixth null, and the audio carrier A falling approximately 13.6 kHz above the seventh null.

Although the comb filter (12 of FIG. 2) has been generally adopted by the television transmission and reception industry, it suffers from certain significant disadvantages that make its universal use problematic. While providing rejection of steady-state signals located at the null frequencies, only the NTSC color subcarrier C is correctly placed in the center of the filter's sixth null frequency. The video and audio carriers V and A occur at frequencies that are offset from their respective filter null positions. This prevents the NTSC video and audio carrier signals from being completely canceled by the filter. In addition to incomplete rejection of the NTSC interference components, the filter also has the effect of modifying data signals which occur at the location of the periodic nulls throughout the 6 MHz HDTV channel. Although the modified data signal can be recovered and somewhat properly decoded by a trellis decoder, the complexity of such a decoder is substantially increased, particularly when it is recognized that the number of slicing levels, comprising the decision loop, will necessarily be increased from 8 to 15 (a consequence of the partial response process characterizing the system).

Moreover, the effects of channel band noise may be significantly increased by the filter. This results, in part, by the reproduction of noise appearing on the input line in the filter's delay stage 13, such that the filter output contains an accumulation of a noise component through the delay stage 13 and a noise component contained in the original signal. As mentioned above, the conventional comb filter is generally effective in rejecting steady-state signal components. Most forms of noise, however, are random in frequency, phase and amplitude. Many situations will necessarily occur when noise components are additive, and the resulting noise product may significantly interfere with desired signals, thereby substantially degrading the quality of an HDTV signal.

Accordingly, there remains a need in the art of HDTV transmission and reception system design, for a more effective system and method of reducing the effects of NTSC co-channel interference. Such a system should be able to selectively and precisely remove interfering NTSC carrier component signals without substantial effect on the remainder of the channel spectrum (i.e., on user significant data). Further, the system should be able to process input channel data and remove unwanted interference components without introducing extraneous noise and without skewing the channel, thereby maintaining the original simplicity of the demodulator block.

SUMMARY OF THE INVENTION

One aspect of the present invention is to provide a system and method which enables the removal of unwanted signal components, such as NTSC co-channel interference components, from composite channel information without introducing extraneous noise and without perturbing any of the remaining signal components of the channel.

In one particular aspect of the invention, an electronic programmable filter is configured to selectively reject NTSC co-channel interference components from a composite input signal representing an HDTV channel. Channel information has been demodulated to baseband prior to being introduced to the filter input. The programmable filter suitably comprises at least one programmable digital frequency synthesizer which defines a signal oscillating at a specific characteristic frequency corresponding to a frequency characteristic of an NTSC co-channel interference component whose removal is desired. The frequency signal from the digital frequency synthesizer is combined with the input channel information in a complex mixer, thereby shifting the channel spectrum by an amount equal to the synthesized frequency signal, thereby positioning the NTSC co-channel interference component in a region symmetrical about DC. A DC cancellation circuit removes a narrow band of frequencies about DC, consequently removing the NTSC co-channel interference component from the channel spectrum.

Following DC cancellation, the channel spectrum is subsequently shifted (upconverted) back to its original baseband representation by combining the shifted spectrum with an additional frequency signal developed by an additional digital frequency synthesizer.

The digital frequency synthesizer is programmable in that particular shift frequencies are defined by a user and communicated to the synthesizer circuit through an intelligence signal; the digital frequency synthesizer faithfully producing a frequency signal oscillating at the user commanded frequency.

In a further aspect of the invention, the programmable filter includes a multiplicity of filter blocks, with each filter block configured to shift an input spectrum by a characteristic frequency amount and then to cancel the frequency components in a narrow band about DC. Each filter block further includes a digital frequency synthesizer operating to develop a characteristic frequency signal each frequency signal corresponding to a displacement metric of the various NTSC co-channel interference components. The filter operates to shift the input spectrum by a first characteristic frequency thereby shifting a first NTSC co-channel interference component to DC, canceling the DC component and then shifting the resulting spectrum in accordance with a second characteristic frequency synthesized by a second digital frequency synthesizer to thereby shift the spectrum such that a second NTSC co-channel interference component is positioned at DC. This second component is removed by a second DC cancellation circuit and the process is repeated, as necessary, for additional interference components which are present in the input spectrum at definable frequencies.

Following cancellation of all unwanted interference components, the input spectrum may be returned to baseband by a further filter element operatively responsive to a further digital frequency synthesizer which produces a frequency signal having a characteristic frequency which corresponds to the algebraic sum of all prior shift frequencies.

More specifically, in one embodiment of the invention each digital frequency synthesizer might output a sinusoidal waveform having both in-phase and quadrature phase components, with the sinusoidal waveform oscillating at the characteristic frequency $\omega$. Further, each respective one of the DC cancellation circuits may be tunable so as to exhibit a cancellation bandwidth of from about 5 Hz to about 2 kHz. According to this aspect of the invention modularity of the programmable filter allows filter elements to be added or removed at need so as to configure the filter to reject any number of interference components from a frequency band, no matter how introduced, so long as the characteristic frequencies of the interference components can be determined with reasonable precision.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

In general terms, the present invention may be aptly described as a selectively programmable electronic filter capable of attenuating specific, user defined, frequencies within a selected input frequency spectrum, such as a 6 MHz television channel spectrum, without introducing spurious and unnecessary poles or zeros to the channel and thus, degrading the image quality of an HDTV signal.

Figure 1:
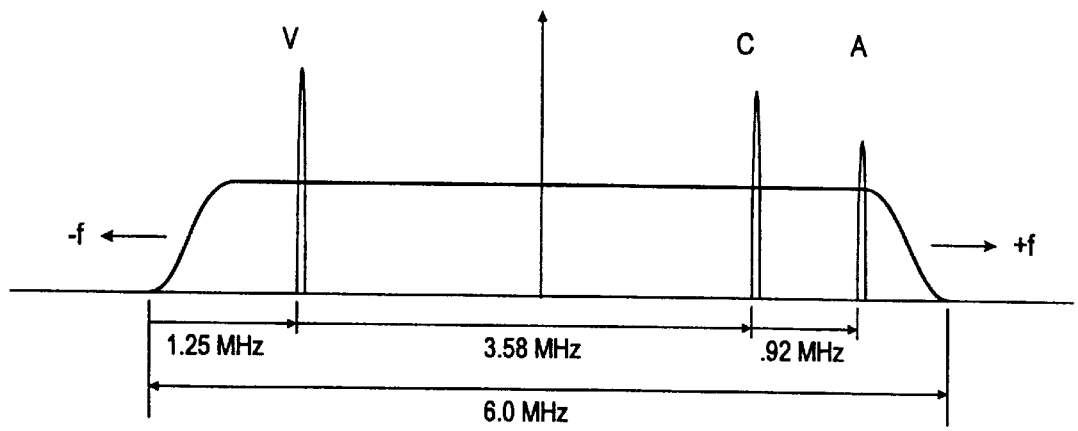
FIG. 1 is a semi-schematic representation of a conventional channel spectrum, illustrated in the frequency domain and in baseband, showing the positions and relative magnitudes of NTSC co-channel interference components according to the prior art.
Figure 2:
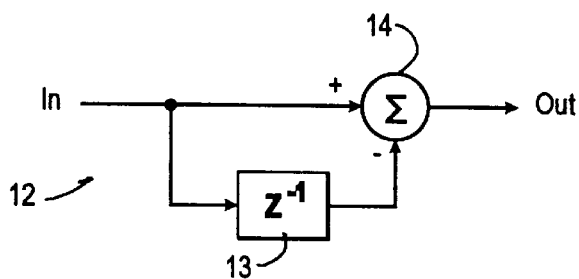
FIG. 2 is a semi-schematic block level diagram of an NTSC interference rejection filter according to the prior art.
Figure 3:
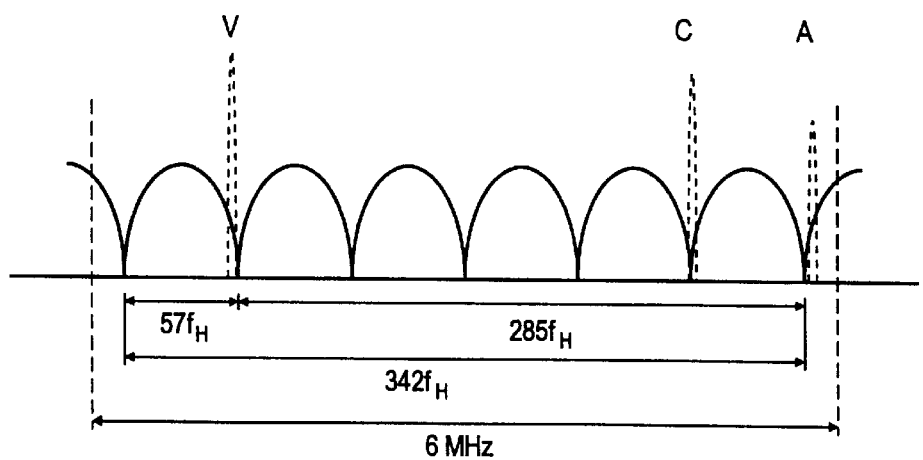
FIG. 3 is a semi-schematic representation of the output frequency response spectrum of the prior art NTSC interference rejection filter of FIG. 2, illustrating the positions and spacing of the output nulls with respect to the NTSC co-channel interference components.
Figure 4:
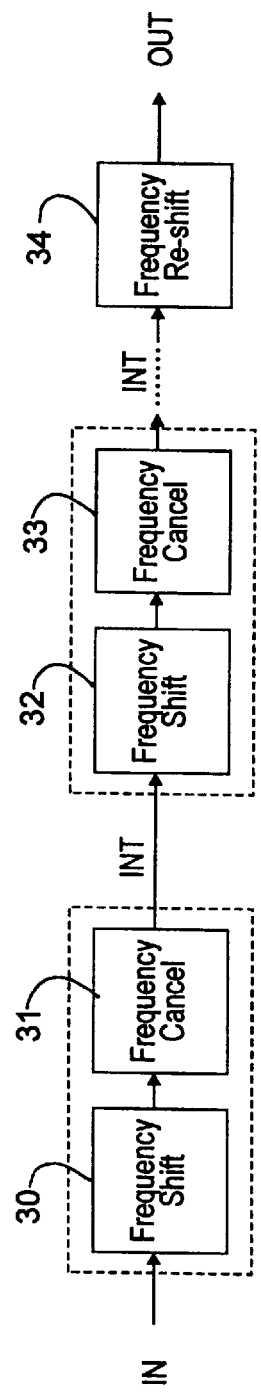
FIG. 4 is a semi-schematic block level diagram of a generalized embodiment of the present invention.

FIG. 4 is a semi-schematic block diagram which depicts the invention in its generalized form. Conceptually, the invention operates upon a selected input frequency spectrum by shifting the spectrum within the frequency domain by a selected amount and then removing a narrow band of frequencies disposed about a particular reference frequency. In the case where it is advantageous to remove a number of undesirable frequency components disposed throughout the input frequency spectrum, the invention replicates the frequency shift and narrow band removal elements a suitable number of times to accommodate all of the undesirable frequency components encompassed by the input frequency spectrum. Thus, as illustrated in FIG. 4, the electronic filter according to the invention processes an input signal in a first frequency shift block 30, thereby shifting the input signal by a first preselected amount, to position a first interference or distortion component with respect to a defined reference frequency. Subsequent to the first frequency shift 30 the signal is directed to a first cancellation block 31 which selectively cancels a narrow band of frequencies in an area related to the reference frequency, thereby defining a first intermediate signal related to the input signal by having been frequency shifted by a first selected amount and by having a narrow band of frequencies, corresponding to a first interference or distortion component, removed therefrom.

As shown in FIG. 4, the first intermediate signal is then directed to a second frequency shift block 32 where the intermediate signal is shifted, in the frequency domain, by a second predetermined amount. Subsequently, the signal is directed to a second cancellation block 33 where a second narrow band of frequencies corresponding to a second undesirable interference or distortion component is removed from the signal, thereby defining a second intermediate signal. The process may be repeated as many times as desired, with each intermediate signal frequency shifted and a narrow band of frequencies canceled therefrom in order to define third, fourth, fifth, etc., intermediate frequencies until all of the interference or distortion components identified for removal have been canceled from the input signal. Following frequency shifting and cancellation, the final intermediate signal is directed to a frequency reshift block 34 where the signal is returned to its original spectrum. Accordingly, the invention may be thought of as encompassing a plurality of steps of frequency shifting and frequency canceling an input signal, with each set of frequency shift and frequency cancellation steps defining a corresponding intermediate signal with a particular interference or distortion component removed therefrom. If the signal is to be reshifted to its original spectrum representation, the number of shifting steps will necessarily be greater than the number of cancellation steps.

Each frequency shifter includes a programmable frequency source that defines the preselected amount by which the input signal, or intermediate signal, is shifted and which is related to a particular interference or distortion component whose removal is desired. In one aspect of the invention, the programmable frequency source functions to shift the input, or intermediate, signal such that the interference or distortion component is shifted to DC, whence the interference or distortion components are removed by canceling a narrow band of frequencies disposed about DC. Cancellation bandwidth is necessarily a function of the characteristics of the interference or distortion component whose removal is desired. If the interference or distortion component is represented by a sharp, narrow band signal, the frequency cancellation block need only cancel those frequencies disposed a few 10's of Hertz to either side of DC. Where the interference or distortion component is spread over a relatively wider band, the bandwidth of the frequency canceller may be varied accordingly such that frequencies disposed a few kilohertz to either side of DC are included in the cancellation bandwidth.

In other words, the present invention attenuates specific, user defined frequencies within an input signal by frequency shifting and subsequently DC canceling the input signal until all desired interference or distortion components are removed. The invention functions equally well with regard to a single interference or distortion component or a multiplicity of interference or distortion components. No matter the number of interference or distortion components desired for removal, all that is required is that for each component, the signal be frequency shifted to bring the component into relationship with a reference frequency and that frequencies corresponding to the interference or distortion component are subsequently canceled from the signal. The signal may or may not be reshifted to its original spectrum depending on the design requirements of downstream components. If the signal is reshifted to its original spectrum, the signal is characterized by only having interference or distortion components removed therefrom.

Figure 5:
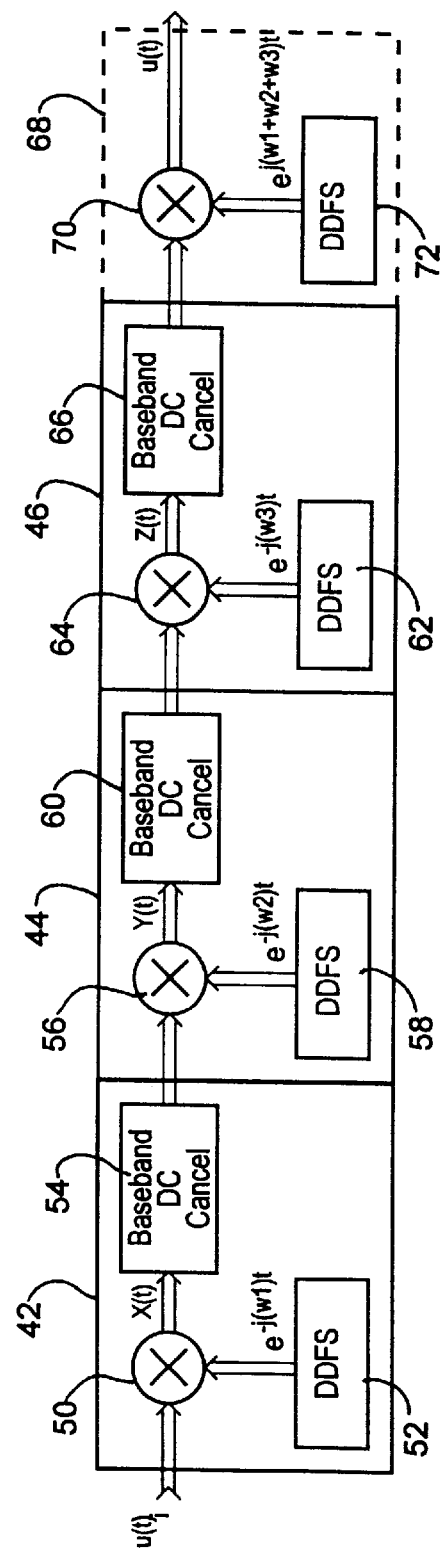
FIG. 5 is a semi-schematic block level diagram of an electronic, programmable, NTSC interference rejection filter constructed according to practice of principles of the present invention.

A particular, exemplary embodiment of the novel selectively programmable electronic filter, is depicted in the semi-schematic block diagram of FIG. 5, in complex signal form, and is operationally configured to function as an NTSC co-channel interference rejection filter. In the illustrated embodiment, an NTSC interference rejection filter, generally indicated at 40, may be thought of as comprising a sequentially disposed bank of generally similar filter elements, each constructed and functioning in accord with principles of the invention. When configured to reject NTSC interference components, the filter is implemented in three stages 42, 44 and 46 each of which are configured to remove one of the three NTSC co-channel interference components (the video carrier, color subcarrier and audio carrier) from a typical 6 MHz HDTV channel spectrum.

A complex-valued input signal, identified as u(t) and representing a recovered complex-valued baseband channel spectrum, including NTSC co-channel interference components, is received by the filter from, for example, a preceding front-end channel tuner block (not shown) of an exemplary HDTV receiver. It should be noted, however, that neither the input frequency spectrum nor the filter's position in a particular application need be specified with any particularity in order to practice the principles of the invention. The exemplary application of the filter embodiment of FIG. 5, the signal conventions, names and whether the signals are complex or real-valued, are employed solely for illustrative purposes and not as limitations to the scope of the invention.

The complex-valued input u(t), is received at the input of the first filter block 42, within which u(t) is directed to and provides one of the complex inputs (I & Q) to a dual port complex multiplier stage 50. In the complex multiplier stage 50, the complex input signal u(t) is modulated (combined), in a process conventionally termed downconversion which will be described in greater detail below, with the complex-valued output of a high-performance direct digital frequency synthesizer (termed a DDFS herein) stage 52. In accord with the invention, the DDFS stage 52 synthesizes phase-coherent periodic signals at specific, programmable, user defined frequencies, denoted in the illustration of FIG. 5 generally as $e^{-i\omega t}$, which are used to modulate (downconvert) the complex input signal u(t) in the complex multiplier 50. At this juncture, it should be mentioned that the notational form of the characteristic output signal of the direct digital frequency synthesizer (DDFS), $e^{-i\omega t}$, assumes the signal is complex-valued. The signal may also be viewed as resolved into real-valued components, a sine($\omega t$) component and a cos($\omega t$) component without disturbing the example. In the example of FIG. 5, the direct digital frequency synthesizer (DDFS) characteristic output signal is expressed as a complex-valued exponential purely for the sake of convenience.

With further reference to FIG. 5, the first filter block 42 comprises a DDFS 52 which produces a complex-valued signal at a first characteristic, user defined frequency, $e^{-i\omega_1 t}$, where $\omega 1$ is the first user definable frequency index. Combining the input signal u(t) with the first characteristic signal $e^{-i\omega_1 t}$ synthesized by the DDFS 52, in the complex multiplier 50, has the effect of shifting the HDTV channel frequency spectrum represented by u(t), up or down, by a specific amount equal to the characteristic frequency $\omega 1$ of the DDFS 52, such that the characteristic frequency $\omega 1$ of the 6 MHz channel band is made to coincide with DC in a frequency domain baseband representation. Thus, the complex multiplier 50 and DDFS 52, in combination, function to frequency shift, or downconvert, the composite frequency elements of the channel spectrum until the channel frequency corresponding to the characteristic frequency of the first DDFS, $\omega$, is shifted to DC.

Following signal conversion, the downconverted complex signal, now represented in FIG. 5 as X(t), is directed to the input of a baseband DC canceler block 54 where frequency components in the region about DC are removed from the channel spectrum, i.e., canceled. In accordance with the present invention, the baseband DC canceler 54 is capable of suppressing signals in the DC region, with a programmable cancellation bandwidth ranging from about 6 Hz to about 2 KHz, with each of the cancellation ranges being symmetric about the DC axis in baseband. Thus, a range of frequencies, having a selectively programmable bandwidth, symmetric about $\omega 1$, is removed from the channel spectrum.

Figure 6:
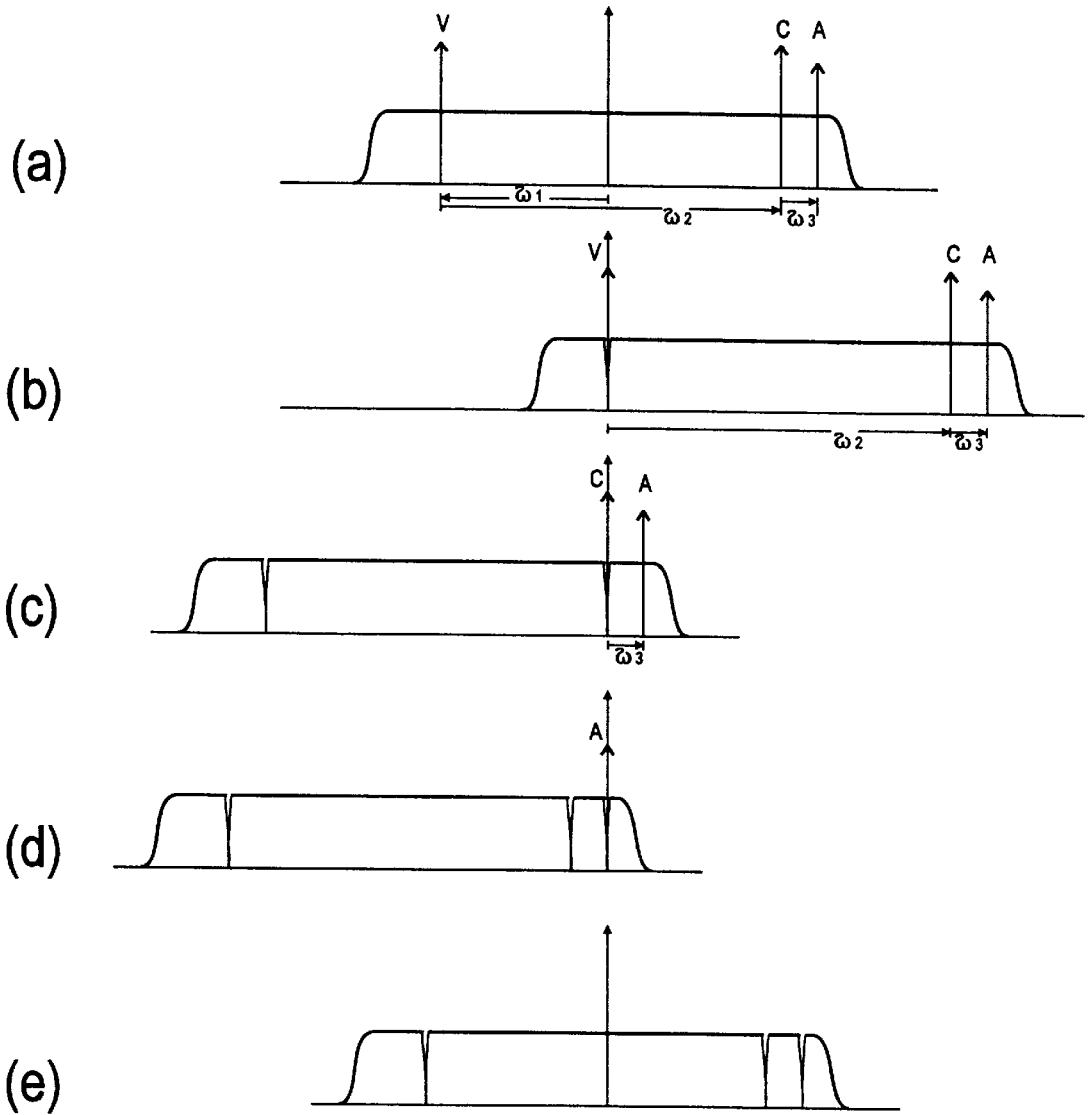
FIGS. 6a–e are a set of semi-schematic frequency diagrams illustrating the operation of the NTSC interference rejection filter of FIG. 5 in canceling the luminance carrier signal.

The utility of this approach will be more clearly understood if the characteristic frequency $\omega 1$ of the conversion signal synthesized by the first DDFS block 52 is recognized as corresponding to the video carrier component's frequency spacing from the channel band edge, i.e., 1.25 MHz. As depicted more clearly in the semi-schematic frequency spectrum diagrams of FIGS. 6(a) to 5(e), the complex multiplier 50 of the first filter block 42 mixes the baseband spectrum of FIG. 6(a) with the DDFS output $e^{-i\omega_1 t}$, thereby shifting (downconverting) the baseband spectrum a characteristic amount $\omega$, and positioning the NTSC video carrier component coincident with DC, as depicted in FIG. 6(b). A notch is introduced, symmetric about DC, by operation of the baseband DC canceler block 54, thereby removing the NTSC video carrier interference component signal from the 6 MHz channel spectrum.

Returning now to FIG. 5, once the video carrier interference component signal is removed, the resulting complex signal, represented as X(t), is output from the first baseband DC canceler 54 and directed to the input of the second, programmable, electronic filter stage 44 where it is applied to one input of a second, dual port, complex multiplier 56. In a manner similar to that described in connection with the first filter block, a second direct digital frequency synthesizer block 58 synthesizes a second complex-valued signal, having a second characteristic frequency, $e^{-i\omega_2 t}$, which is combined with the output of the first filter block X(t) in the second complex multiplier 56. The second complex multiplier 56 functions to again shift the frequency spectrum by a characteristic amount equal to the characteristic frequency $\omega 2$ of the signal synthesized by the second DDFS block 58, such that frequencies once displaced from DC by $\omega 2$ now are coincident with DC. Once the spectrum has been shifted by the desired amount, the frequencies in a range about DC are once again removed (canceled) by a second baseband DC canceler block 60.

The operation of the second programmable electronic filter block 44 and its resultant effect on the channel spectrum may be further understood with reference to the semi-schematic frequency spectrum diagrams of FIGS. 6(b) and 5(c). In FIG. 6(b) it can be seen that the NTSC color subcarrier is located a distance of $\omega 2$ from the video carrier, in the frequency domain. After the video carrier has been removed, FIG. 6(c) illustrates the resulting channel frequency distribution after the signal has been shifted once again, i.e., downconverted by a characteristic amount equal to the characteristic frequency $\omega 2$ of signal synthesized by the second DDFS 58 of the second programmable electronic filter block 44. It should be noted that the second characteristic frequency $\omega 2$ is equal to approximately 3.58 MHz and represents the frequency difference between the NTSC color subcarrier interference component and the NTSC video carrier interference, at least as they are presently defined. Thus, it will be understood that the second programmable electronic filter bank 44 functions to shift the channel spectrum such that the color subcarrier interference component is made to coincide with baseband DC and then to apply a DC cancellation to a narrow band of frequencies, symmetrical about DC, such that the color subcarrier interference component is removed from the channel spectrum.

In similar fashion, the third programmable electronic filter bank 46 receives the complex-valued input signal Y(t) output from the baseband DC canceler 60 of the second programmable electronic filter bank 44 and directs Y(t) to the input of a third, dual port, complex multiplier 64. In a manner similar to that described in connection with the first and second filter blocks, a third direct digital frequency synthesizer block 62 synthesizes a third complex-valued signal, $e^{-i\omega_3 t}$, having a third characteristic frequency $\omega 3$. This third signal is once again combined with the output of the second filter block Y(t) in the third complex multiplier 64, and the resultant complex-valued signal, now denoted Z(t), is directed to the input of a third baseband DC canceler 66. In the same fashion as the first and second programmable electronic filter blocks 42 and 44, the third programmable electronic filter block 46 functions to shift the channel spectrum a third amount equal to the characteristic frequency $\omega 3$ of the downconversion signal developed in the third DDFS block 62 as illustrated in the spectrum representation of FIG. 6(d).

As illustrated in FIG. 6(d), the characteristic frequency $\omega 3$ developed by the third DDFS block 62 corresponds to the frequency spacing between the NTSC color subcarrier interference component and the NTSC audio carrier interference component. As is well understood in the art, the NTSC audio carrier component position of the spectrum may be viewed in a number of ways. Conventionally, the audio carrier is variously described as being spaced 0.25 MHz from the top end of the channel spectrum, 4.5 MHz from (above) the video carrier, or about 0.92 MHz from (above) the color subcarrier signal. In the context of the illustrated embodiment, particularly with regard to the illustration of FIG. 6(d), the third characteristic frequency ω3 developed by the third DDFS block 62 is equal to approximately 0.92 MHz, i.e., the frequency separation between the color subcarrier interference component removed in the second filter block 44 and the position of the audio carrier interference component in the frequency domain.

Once the three NTSC interference components are removed from the HDTV channel spectrum, it should be recognized that the resultant channel spectrum Z(t) is displaced in frequency from its initial symmetry about DC, by an amount equal to the algebraic sum of the frequency components of the signals synthesized by the various DDFS circuits. Z(t) accordingly must be translated (upconverted) back to u(t), i.e., baseband, prior to further down-stream processing such as carrier recovery, equalization, and the like. Accordingly, after NTSC interference component removal, the HDTV channel spectrum is upconverted in an upconversion stage 68, suitably comprising an additional complex multiplier 70 and yet a further direct digital frequency synthesizer block 72. In a manner substantially similar to the DDFS blocks of the prior downconversion and DC cancellation stages, the DDFS block 72 of the upconversion stage 70 defines a third complex-valued signal $e^{i(\omega 1+\omega 2+\omega 3)t}$ which has a characteristic frequency representing the algebraic sum of the characteristic frequencies of the DDFS blocks 52, 58 and 62 of the prior downconversion and DC cancellation stages 42, 44 and 46, respectively. This characteristic synthesized frequency signal is combined with Z(t) in complex multiplier 70 to remove the frequency displacement effects of the downconversion and DC canceler stages, thereby, as depicted in the spectrum diagrams of FIGS. 6(d) and 5(e), shifting the channel spectrum back to its initial baseband position, i.e., symmetric about DC.

Having reference now to FIG. 6(e), it will be evident that the original input frequency spectrum u(t) has been reproduced with a high degree of fidelity and with relatively little spurious data signal loss. In the case of a complex HDTV channel, the signal output by the filter in accord with the invention, will be characterized by very narrow-band frequency notches. Each frequency notch is, in turn, characterized by a user programmable bandwidth in the range of from about 6 Hz to about 2 KHz, with each notch corresponding to and coinciding with only the specific, characteristic frequencies of the video, color and audio carrier components of an NTSC co-channel interference signal.

In other words, the programmable electronic filter 40, in accord with the illustrated embodiment, can be thought of as a combination of sequential modular elements, each configured to adaptively translate a complex channel by a specific desired frequency and then cancel the channel components in the DC region. Multiple elements allow multiple frequency components to be removed without perturbing the remaining spectrum. Filtration thus occurs only at the specified frequencies.

Noise amplification in the cancellation regions is no longer problematic, since the noise response characteristics in these regions depend on the characteristics of a DC cancellation circuit. These circuits are well understood by those having skill in the art and require no further elaboration herein. However, for completeness, an exemplary DC cancellation circuit, suitable for incorporation in the programmable filter of the invention, is illustrated in semi-schematic block diagram form in FIG. 7.

Figure 7:
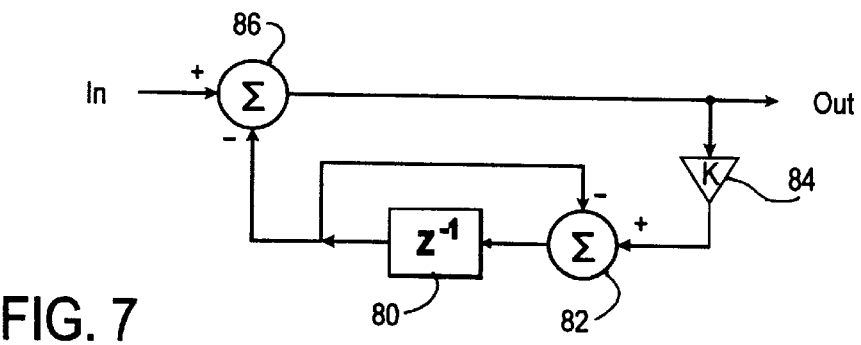
FIG. 7 is a semi-schematic block diagram of a common baseband DC cancellation circuit.

Briefly, the DC cancellation circuit of FIG. 7 includes a delay element 80, represented as an inverse z transform block, whose output is feedback coupled to a summing circuit 82, where it is negatively combined with the output of a gain stage 84. The gain stage is constructed to exhibit a gain (K) which is typically less than unity in the exemplary embodiment.

The output of the delay element 80 is also negatively combined with an input signal (In) in an input summing circuit 86, the output of which defines the output of the cancellation circuit, as well as the input of the gain stage 84.

In operation, the exemplary DC cancellation circuit of FIG. 7 functions to remove a band of frequencies from the input signal (In), with the frequencies and the band characteristics defined by the filter element design values. In the present case, the center frequency is DC and the filter cancellation bandwidth may be modulated by varying the design parameters of the inverse z transform block 80 and the gain stage 84.

Figure 8:
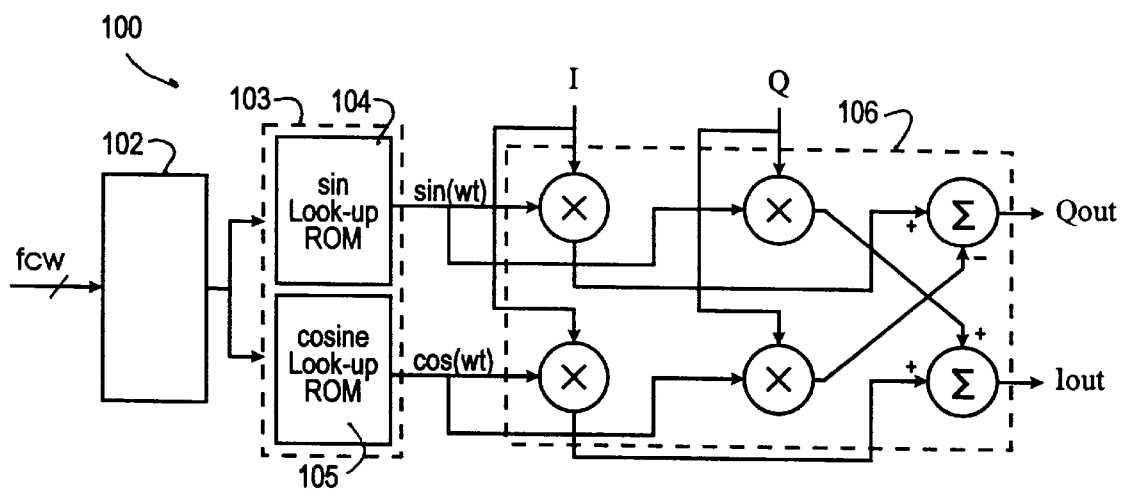
FIG. 8 semi-schematic block diagram of a QDDFS and complex multiplier combination in accordance with the principles of the invention.

A particular implementation of a DDFS (more specifically a quadrature direct digital frequency synthesizer or QDDFS), and complex mixer combination, suitable for implementation in an NTSC interference rejection filter according to the present invention, is depicted in semi-schematic block diagram form in FIG. 8. Conventionally, the DDFS, indicated generally at 100, is termed a QDDFS since it comprises a pair of operational signal paths operating in quadrature with each other, so as to develop sine and cosine signals having specific phase arguments and at particular frequencies. Sine and cosine signals are able to be developed at multiple frequencies, with any particular frequency of interest being generated in operative response to a multi-bit frequency control word (FCW). The frequency control word is input to a phase accumulator, or alternatively an integrator, 102 which generates the phase argument of the sine/cosine function. In conventional fashion, the binary structure of the frequency control word identifies the particular frequency at which the complimentary sine/cosine waveforms are to be generated.

A sine/cosine function generator is suitably implemented, in the illustrated embodiment, as dual sine/cosine ROM look-up tables, each of which contains a digital representation of a respective sine/cosine waveform. Specifically, a representative periodic waveform (a complete sine wave, for example) is resolved into $2^{12}$ discrete samples with each sample defining a discrete point of the waveform. Each of the $2^{12}$ samples are stored, as 10-bit characters, in respective $2^{12}$ addressable locations in each respective ROM look-up table (sine and cosine). As addressable locations are sequentially accessed and output, the sample values reconstruct sine or cosine waveforms.

Frequency of the output waveform is determined by the argument of the frequency control word which defines the sampling spacing of samples taken from the digitized sine/cosine waveform. By way of example, if the sampling spacing (address spacing) were zero, the same address would be accessed, the same 10-bit sample would be returned for every output clock, and the output frequency would be zero. Depending on the input phase argument, the output signal level might also be zero, or might include a positive or negative DC component. If the address sample spacing were one, each and every 10-bit sample word would be output, one sample word at each clock. Thus, the output waveform would exhibit a frequency equal to $f_c/4096$, where $f_c$ is the clock frequency. As address sample spacing increases, i.e., coarser waveform definition, the output frequency necessarily increases. Further, those having skill in the art will understand that the maximum output frequency of a DDFS constructed in accordance with the embodiment of FIG. 8, will necessarily be limited by the Nyquist sampling criterion, sometimes expressed as about one half (½) the chosen clock frequency $f_c$.

Once a sine and cosine waveform, having the appropriate phase and frequency characteristics, are synthesized, the sine and cosine waveforms are mixed with the in-phase and quadraturephase signals I and Q, which are the real-valued equivalents to the complex frequency spectrum (u(t), X(t), Y(t), or Z(t)) to be modulated, in a complex mixer 106. The construction of the complex mixer 106 may be conventional in form and functions to combine the two sets of signals in accord with complex multiplication principles, to achieve an equivalent complex-valued product; in the case of the illustrated embodiment, the mixer 106 shifts the complex-valued frequency spectrum represented by I and Q, by an amount $e^{j\omega t}$, where $\omega$ represents the frequency of the output sine/cosine waveforms $\sin(\omega t)$ and $\cos(\omega t)$, to define Iout and Qout, where:

$$Iout = [I \sin(\omega t) - Q \cos(\omega t)]; \text{ and}$$

$$Qout = [I \cos(\omega t) + Q \sin(\omega t)]$$

Various alternative QDDFS architectures will become apparent to one having skill in the art, when one considers the quarter-wave symmetry of a sine wave and the $\pi/2$ phase relationship between sine and cosine waveforms. An alternative DDFS architecture might be constructed to take advantage of the quarter wave symmetry of a sine wave in order to reduce ROM storage requirements. Only sine samples from 0 to $\pi/2$ may be stored in the ROM look-up table and a quadrant designator bit, such as a second most significant bit developed by the integrator, might used to determine the waveform quadrant, thereby synthesizing a sine wave from 0 to $\pi$. The most significant bit might then used as a sign bit in order to complete the synthesis of the sine wave from 0 to $2\pi$. In the case of a cosine waveform, its 0 crossings are advanced by $\pi/2$ with respect to those of a sine waveform. Thus, the MSB from the integrator might be EXORed with the second MSB in order to generate the sign bit and synthesize a complete cosine wave from 0 to $2\pi$.

For designs where quadrature outputs are desired, the above-described system would store both sine and cosine samples, from 0 to $\pi/2$, in respective ROM look-up tables. Alternatively, a system designer could take advantage of the eighth wave symmetry of a sine and cosine wave form, since sine samples from 0 to $\pi/4$ are the same as cosine samples from $\pi/4$ to $\pi/2$. Similarly, cosine samples from 0 to $\pi/4$ are the same as sine samples from $\pi/4$ to $\pi/2$. Thus, one need only store sine and cosine samples from 0 to $\pi/4$. The third MSB from the integrator might be used to select between the samples, with the third MSB EXORed with the second MSB in order to produce the selection signal. This last is necessary such that the select signal is phase aligned with the eighth wave symmetry axis plane of the sine and cosine waveform.

Although various embodiments of a DDFS circuit have been described, these descriptions are for illustrative purposes only and are not intended as limiting the invention to any particular adaptation of a frequency synthesis circuit. The actual form of the DDFS implementation is immaterial to practice of the invention, so long as the DDFS is capable of synthesizing periodic waveforms having user definable frequency characteristics.

Up to this point, the programmable, electronic filter according to the invention, has been described in connection with its usefulness in terrestrial mode HDTV television and reception systems, and particularly in connection with NTSC co-channel interference rejection. Notwithstanding the foregoing, it will be immediately recognized that the programmable, electronic filter according to the invention has particular utility in a substantial number of varying and different digital communication system applications. One exemplary alternative application is the use of the programmable electronic filter in CATV reception equipment as a means to provide selective and efficient rejection of spurious, non-random noise or interference signals, i.e., distortion, pertinent to CATV-type transmission media and CATV-type system architectures.

One of the advantages of broadband transmission media is its ability to allow a substantial expansion of the number of transmission channels available for television signals, including HDTV cablecasts. Additional channels are available at higher and higher frequencies and, at least for the immediate future, will be populated with both NTSC standard signals and HDTV signals. Given the large numbers of signal channels present in a modern composite channel, it should not be difficult to understand that the channel's very capacity allows a large number of distortion sources to coexist with a desired HDTV channel, for example. Although the type of adjacent channel distortion, which gives rise to NTSC interference in terrestrial broadcast modes, is not present in transmission line architectures, other means of introducing NTSC interference signals into an HDTV channel are indeed present. Specifically, channel impairment might be caused by a variety of well understood distortion sources, such as "signal to second harmonic" distortion and "signal to third harmonic" distortion effects which, when summed over the frequency spectra of all of the channels on a transmission line, can give rise to substantial, frequency specific, noise spikes. Video carrier, color subcarrier and audio carrier signals which are generated by a particular NTSC transmitter down-band from, for example, an HDTV channel, are also replicated by the NTSC transmitter in multiple harmonic sidebands. Although a carrier or subcarrier component in a harmonic sideband is attenuated, the sideband is nevertheless accessible to higher and lower order harmonics produced by other NTSC transmitters that are further down-band or up-band. Fortunately, since the amplitude characteristics of these sidebands approach a negligible level, the farther away they are from the fundamental and since the data composites of these sidebands are random with respect to one another, composite data signals from up-band or down-band transmitters would not impair the performance of a selected HDTV channel. However, the NTSC components are quite frequency specific and share the same phase relationships. Thus, even HDCATV reception equipment must include some means for removing these accumulated, frequency specific, distortion components.

Extensive tests and evaluations have been performed on various CATV systems to determine the properties of signal distortions, i.e., composite second order (CSO) and composite triple beat (CTB), as a function of the number and frequencies of television channels comprising a CATV system. Distortion tends to significantly increase in direct proportion to the number of channels in the system and also tends to increase in direct proportion to channel frequency. However, since the most prevalent distortion sources are frequency specific, these distortions can be characterized with respect to frequency and removed from an input HDTV signal in accordance with the present invention.

Indeed, the programmable electronic filter of the invention has application to any communication system no matter what the channel media and no matter what the source of any frequency specific component deemed to be impairing the channel. Because of its modular nature, the impairment source might comprise a single signal, in which case only a single filter stage will be necessary, or might comprise multiple signals, in which case each signal will spawn a corresponding filter stage. All that is required is that an interference source be determinable and occur at a specific, known frequency, such that the interference source frequency can form the basis of a corresponding DDFS synthesized signal.

A programmable electronic filter has been described in the context of illustrated embodiments directed to NTSC co-channel interference rejection. Filter functions to shift a frequency spectrum by a pre-determined amount to thereby center an interference source about DC, prior to canceling a narrow band of frequencies about DC in order to remove the interference source from a frequency spectrum. Subsequent interference components are removed by subsequently shifting the frequency spectrum in any desired direction for any desired frequency distance. After all of the interference components are removed, frequency spectrum is returned to baseband or to any other frequency location, by a final frequency shift process.

While the invention has been described in terms of operating on complex-valued signals, it will be evident to one having skill in the art that complex-valued signals may be easily resolved into their real-value analogs and that the electronic filter according to the invention is equally capable of functioning in real-value terms. It will thus be recognized by those skilled in the art that various modifications may be made to the illustrated and other embodiments of the invention described above, without departing from the broad inventive scope thereof. It will be understood therefore that the invention is not limited to the particular embodiments or arrangements disclosed but is rather intended to include any changes, adaptations or modifications which are within the scope and spirit of the invention as defined by the appended claims.

What is claimed is:

1. A method for rejecting at least one particular interference signal from an input frequency spectrum, the method comprising:
   shifting the input spectrum, in the frequency domain, by a first selected amount, thereby positioning the particular interference signal about DC, as a result of the spectrum shift;
   canceling the input spectrum frequency components in the region about DC in order to remove the particular interference signal from the input spectrum, thereby defining an intermediate spectrum;
   shifting the intermediate spectrum in the frequency domain by a second selected amount, thereby positioning an additional particular interference signal about DC, as a result of the additional spectrum shift; and
   canceling the spectrum frequency components in the region about DC in order to remove the additional particular interference signal from the intermediate spectrum, thereby defining a second intermediate spectrum.

2. The method according to claim 1, comprising the step of shifting the second intermediate spectrum by a third selected amount equal to the algebraic sum of the prior selected amounts, so as to return the spectrum signal to its original input band.

3. The method according to claim 2, wherein each selected amount comprises a frequency signal developed by respective, programmable digital frequency synthesis circuits.

4. The method according to claim 3, wherein each frequency signal comprises an in-phase and quadrature phase component suitable for combination with a complex input frequency spectrum represented in baseband.

5. The method according to claim 4, wherein each particular interference signal corresponds to an NTSC co-channel interference component.

6. The method according to claim 5, wherein the NTSC co-channel interference components are selected from the group consisting of an NTSC video carrier signal, an NTSC color subcarrier signal and an NTSC audio carrier signal, and wherein the input frequency spectrum is an HDTV channel.

7. An electronic, programmable filter, configured to selectively reject at least one particular interference signal residing at a characteristic frequency location in a frequency spectrum defining a composite input signal, the filter comprising:
   an input for receiving the input frequency spectrum;
   a frequency synthesizer, configured to produce a frequency signal characterized by the characteristic frequency location of the at least one particular interference signal;
   a mixer connected to the input and the frequency synthesizer, the mixer combining the frequency signal and the input frequency spectrum to thereby shift the input spectrum by a characteristic amount equal to the frequency signal thereby positioning the particular interference signal at a reference frequency position;
   a cancellation circuit, connected to receive an output from the mixer, the cancellation circuit configured to cancel signal components in the region about the reference frequency thereby rejecting the particular interference signal;
   wherein the frequency synthesizer is adaptively configureable to produce a frequency signal at a multiplicity of frequencies the specific frequency characterizing the frequency signal being determinable by a user-provided intelligence signal;
   wherein the input, frequency synthesizer, mixer and cancellation circuit comprise a filter block for operating on a particular interference signal, the filter further comprising:
   a plurality of additional filter blocks, sequentially disposed in serial fashion with the first filter block, each additional filter block comprising a respective frequency synthesizer, each producing a respective frequency signal characterized by respective characteristic frequency locations of respective additional particular interference signals appearing in an input frequency spectrum; and
   a plurality of respective cancellation circuits each disposed in a corresponding respective filter block, each filter block shifting the input spectrum by a characteristic amount equal to its respective frequency signal, thereby positioning each particular interference signal at a corresponding respective reference frequency position, each respective cancellation circuit canceling signal components in the region about the reference frequency, thereby rejecting the plurality of particular interference signals from the input frequency spectrum.

8. The electronic, programmable filter according to claim 7, further comprising an upconversion circuit coupled at a distal position along the series-connected filter blocks, the upconversion circuit further comprising:

an input for receiving the shifted input frequency spectrum;

a frequency synthesizer, configured to produce a frequency signal characterized by the algebraic sum of the frequency signals produced by each of the synthesizers comprising the series-connected filter blocks; and a mixer connected to the input and the frequency synthesizer, the mixer combining the frequency signal and the shifted frequency spectrum to thereby upconvert the shifted frequency spectrum back to its original, unshifted configuration.

9. The electronic, programmable filter according to claim 8, wherein the input frequency spectrum comprises an HDTV channel represented in baseband.

10. An electronic, programmable filter according to claim 9, wherein the reference frequency position to which each of the plurality of particular interference signals is shifted by each respective frequency synthesizer is DC.

11. The electronic, programmable filter according to claim 10, wherein each respective cancellation circuit is a DC canceler.

12. The electronic, programmable filter according to claim 11, wherein each respective frequency signal produced by each respective frequency synthesizer comprises a sinusoidal signal having an in-phase component and a quadrature phase component, and wherein each respective mixer is a complex mixer.

13. A method of attenuating particular, user defined frequencies within an input signal comprising:

frequency shifting the input signal such that a user defined frequency is positioned in relation to a reference frequency;

canceling a selected band of frequencies positioned in relation to the reference frequency;

wherein the frequency shifting and canceling operations are each performed a number of times, and wherein the number is at least equal to the number of user defined frequencies; and wherein the number of frequency shifting steps is greater than the number of cancellation steps.

14. The method according to claim 13, with each frequency shifting and cancellation step defining an intermediate signal, the method further comprising frequency re-shifting an intermediate signal to position the signal in relation to the input signal in the frequency domain.

15. The method according to claim 14, wherein the reference frequency is DC, each frequency shifting step positioning a user defined frequency at DC.

16. The method according to claim 15, wherein each cancellation step is a DC cancellation step.

* * * * *